United States Patent [19]

Horna

[11] 4,360,712

[45] Nov. 23, 1982

[54] DOUBLE TALK DETECTOR FOR ECHO CANCELLERS

[75] Inventor: Otakar A. Horna, Bethesda, Md.

[73] Assignee: Communications Satellite Corporation, Washington, D.C.

[21] Appl. No.: 72,813

[22] Filed: Sep. 5, 1979

[51] Int. Cl.³ .............................................. H04B 3/20
[52] U.S. Cl. ................................ 179/170.2; 179/170.6
[58] Field of Search ................. 179/170.2, 170.6, 170.8

[56] References Cited

U.S. PATENT DOCUMENTS

| | | | |
|---|---|---|---|
| 3,894,200 | 7/1975 | Campanella et al. | 179/170.2 |
| 3,992,594 | 11/1976 | Helder | 179/170.6 |
| 4,005,277 | 1/1977 | Araseki et al. | 179/170.2 |
| 4,029,912 | 6/1977 | Geigel et al. | 179/170.2 |
| 4,129,753 | 12/1978 | Duttweiler | 179/170.2 |

Primary Examiner—Bernard Konick
Assistant Examiner—Randall P. Myers

Attorney, Agent, or Firm—Sughrue, Mion, Zinn, Macpeak & Seas

[57] ABSTRACT

Three double talk detectors (DTD) are used in combination with an echo canceller having an adaptive filter and a center clipper. First and second double talk detectors are used in the presence of double talk to selectively freeze the adaptive filter correction loop and to disable the center clipper. The third double talk detector is used to detect the initial adaptive period of the echo canceller. Control of the adaptive filter and clipper is effectively transferred from the first to the second double talk detector upon termination of the initial adaptive period as determined by the third double talk detector. The third double talk detector also detects a false double talk condition (where the distant talker pauses in speech) and overrides the second double talk detector in order to maintain the clipper in an active state.

23 Claims, 3 Drawing Figures

DOUBLE TALK DETECTOR FOR ECHO CANCELLERS

BACKGROUND OF THE INVENTION

Echo cancellation circuits which are well known in the telephone communications environment usually employ a form of adaptive finite impulse response digital filter. In a typical system the echo suppression apparatus at the near subscriber functions to disable the outgoing path from that subscriber when signals from the far end subscriber appear on the incoming path. Echoes due to incoming signals on the receive path are, therefore, prevented from returning to the far end subscriber over the outgoing path. Double talking refers to the condition when the near end subscriber breaks in and both subscribers are talking simultaneously. Prior art echo suppressors include double talk detectors which distinguish between speech signals generated on the outgoing path by the near end subscriber (double talk signals) and echo signals returning on the outgoing path due to the far end subscriber speech signals on the incoming path. If the outgoing path signal exceeds the incoming path signal it is assumed that the near end subscriber is transmitting and the echo suppression is disabled. When the opposite condition occurs it is assumed that the near end subscriber is not transmitting and the echo is suppressed.

The patents to May, Jr. (U.S. Pat. No. 3,973,086), Helder (U.S. Pat. No. 3,992,594) and Geigel et al. (U.S. Pat. No. 4,029,912) discuss the problem of distinguishing between an echo and double talk. The above systems work by initially providing an approximated echo using a pair of storage memories, one following decreasing magnitude signals to give an output corresponding to the anticipated (or worst case) echo end delay, while the other memory is used to approximate echo as long as its output is less than the output of the first memory. Otherwise, the first memory is used for the echo approximation. The second memory follows increasing magnitude signals, less a certain transmission loss, and holds the value of the last signal peak while the signal magnitude is decreasing. These approximations are compared with the actual signals on the echo return path. Double talk detection by this method is evidenced in all three of the above-mentioned patents. This method is different than that of the subject disclosure in which a third detector is used to control the signal path through the other detectors during initial adaptive filtering when the residual echo is less than the true echo.

The patent to Araseki et al. (U.S. Pat. No. 4,005,277) describes an echo controller comprising a mode switch for switching an echo suppressor and canceller. This switch normally supplies the echo cancelled signal to the outgoing path and further evaluates characteristics of the echo path and operation of the echo canceller to substitute the echo suppressed signal for the echo cancelled signal only when the path characteristics are questionable. The mode switch thus monitors the double talk and carries out the switching between the echo cancelled and suppressed signals in the absence of double talk.

Other patents to Araseki et al. (U.S. Pat. No. 4,012,603) and Ochiai et al. (U.S. Pat. No. 3,787,645) discuss various aspects of this type of double talk detection system.

A "Twelve-Channel Digital Echo Canceller" which uses a digital filter and a center clipper is described by D. Duttweiler in *IEEE Transactions on Communications,* Vol. Com-26, No. 5, May 1978.

The prior art, such as that discussed above, is further illustrated in FIG. 1, which shows an echo canceller circuit at the near talker location. A received signal from the distant talker Dt is passed through insulating amplifier 7 to the receiver output Ro. Path 2 represents the arbitrary path taken by the received signal causing an echo thereof to be fed back into the transmitting portion of near talker equipment. The echo signal Ec is similar to the signal Dt but attenuated by the propagating medium 2.

The use of adaptive filter 1 for echo cancellation in long distance telephone circuits is well known and described in detail by S. J. Campanella et al., "ANALYSIS OF AN ADAPTIVE IMPULSE RESPONSE ECHO CANCELLER", Comsat Technical Review, Vol. 2, No. 1, Spring 1972, pp. 1–36, and by O. A. Horna, "ECHO CANCELLER UTILIZING PSUEDO LOGARITHMIC COATING", NTC 1977 Conference Record, Vol. 1, pp. 04:7-1 through 04:7-8. Such adaptive filters compute an estimate E'c of the true echo signal Ec and apply it to subtractor circuit 3. After an initial adaptive period, the proper transfer characteristic is developed in filter 1 and only a small residual echo signal Re remains at the output subtractor 3. The residual Re is then easily suppressed by a non-linear center clipper circuit.

Both adaptive filter 1 and center clipper 5 may remain in an active state as long as desired to effect cancellation of the echo signal Ec. However, in the event that the near talker breaks into the conversation, a "double talk" condition occurs. Both the echo Ec and the near talker speech Nt appear at the input to the transmitting portion of the near talker equipment. Under these conditions, two changes must take place: (1) the adaptation process of the filter 1 must be "frozen" so that it will not be contaminated by the uncorrelated near talker signal Nt and (2) the center clipper 5 must be disabled in order not to distort the near talker speech. The residual echo signal Re, being much smaller than Nt is completely masked by the speech signal.

The function of the circuit in FIG. 1 is based on the assumption that during double talk, the volume of near talker speech Nt is higher than the volume of the echo, i.e., Nt is greater than Ec. The tripping point of double talk detector 6 can be adjusted to indicate a double talk condition when, $$Si = Ec + Nt > 0.5 Dt.$$

Detector 6 under these conditions disables the center clipper 5 and the correction loop of filter 1 over lines 9 and 8, respectively.

Certain conditions will degrade performance of the latter echo cancellation circuit. One such condition, known as false double talk, can occur when the distant speaker pauses. The echo, delayed due to the propagation delays inherent in path 2, will be greater than 0.5 Dt thereby causing the double talk detector to falsely indicate a double talk condition. Center clipper 5 will be turned off resulting in a burst of residual echo Re on the send-out line.

The opposite situation exists when the near talker speech is of a lower amplitude than the echo signal. This can occur in low quality, long two-wire circuits. In this case, detector 6 is unable to detect the double talk condition and the impulse response of filter 1 is contaminated and the center clipper distorts the speech signal Nt.

SUMMARY OF THE INVENTION

The degradation of the echo canceller performance as described above is avoided by the use of a plurality of double talk detectors. Specifically, a first double talk detector is provided to measure the signal transmitted by the near talker station, which signal includes near talker speech (when present) and the echo signal. The first double talk detector compares this signal with the signal received from the distant talker station. A second double talk detector is provided to measure a signal comprising the near talker speech (when present) and the residual echo remaining after the subtraction of the synthesized echo signal produced by the adaptive filter from the true echo signal. Double talk detector 2 compares this composite signal to the signal received from the distant talker station.

A third double talk detector is provided to compare the composite signal comprising the near talker speech (when present) and the echo signal with a second composite signal comprising the near talker speech and the residual echo signal. The third double talk detector functions to determine the extent of the initial adaptive period, that is, the period of time it takes for the adaptive filter to drive the residual echo signal to an arbitrarily small value. The third double talk detector also determines the presence of a false double talk condition.

The outputs of each of the double talk detectors are logically combined to effect control of the adaptive filter and the center clipper. The combinatorial logic specifically provides for effective control of the filter and clipper by the first double talk detector during the initial adaptive period as determined by the third double talk detector. Control is subsequently switched to the second double talk detector upon the transition from the initial adaptive period to a steady state condition where the adaptive filter is producing an accurate estimated echo signal. The third double talk detector furthermore oversees the operation of the second double talk detector to insure that the second double talk detector does not respond to a false double talk condition.

DETAILED DESCRIPTION OF THE PREFERRED EMBODIMENTS

Figure 1:
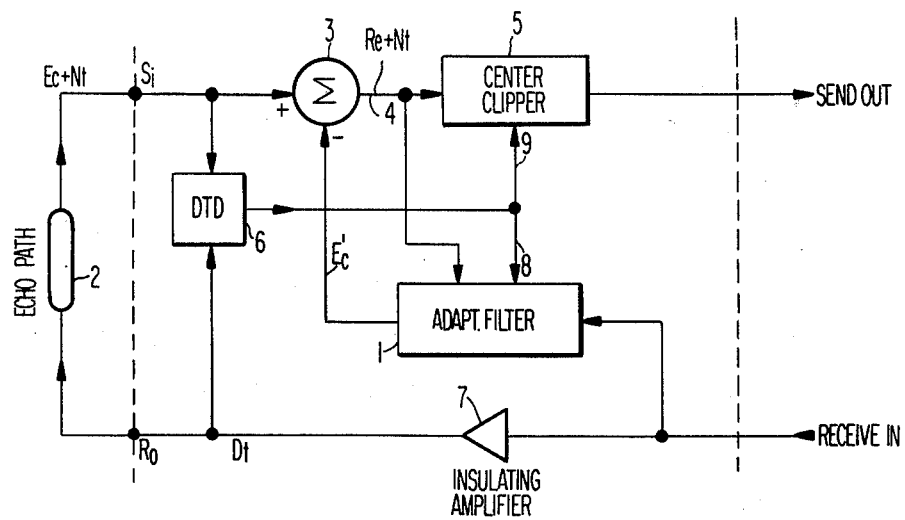
FIG. 1 is a block diagram of a prior art echo cancellation circuit.
Figure 3:
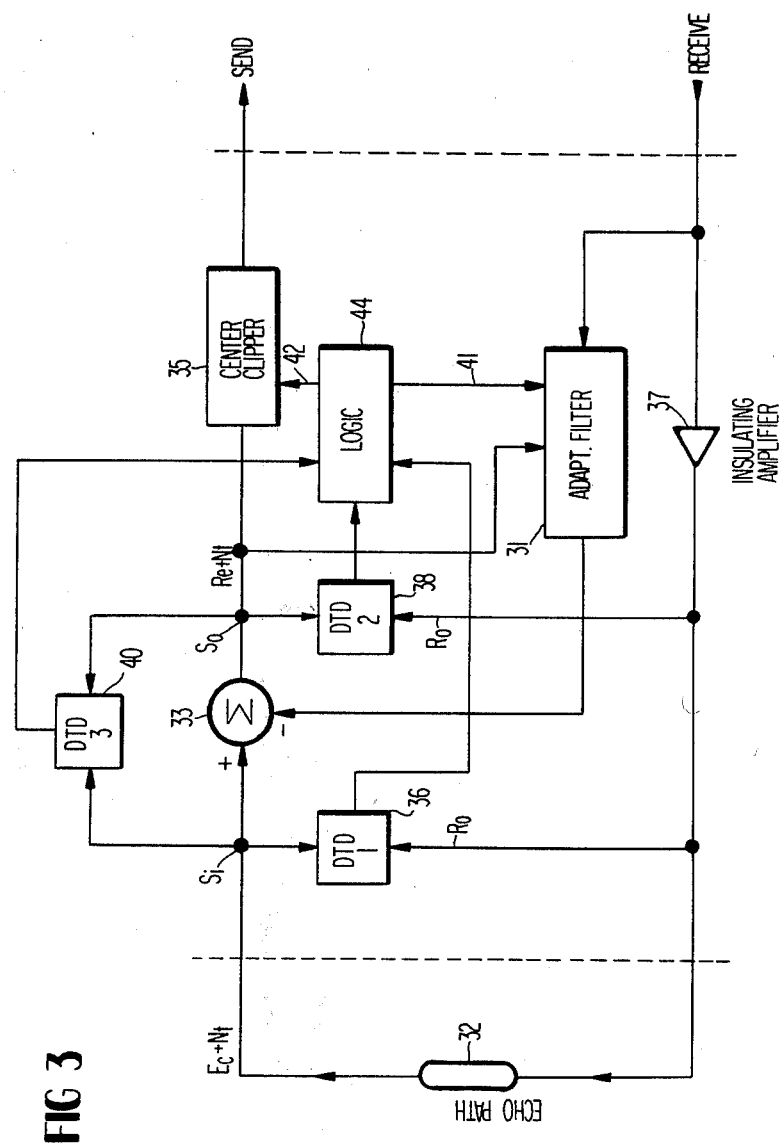
FIG. 3 is a block diagram of a preferred embodiment of the present invention.

A preferred embodiment of the invention, as shown in FIG. 3, includes adaptive filter 31 and center clipper 35 to cancel the echo signal in a manner similar to the circuit of FIG. 1. Control of the filter and clipper, however, is fundamentally different than the FIG. 1 system.

The incoming signal from a distant talker is received on the receive line and applied to adaptive filter 31 and insulating amplifier 37. The output signal, Ro from amplifier 37 is applied to first and second double talk detectors 36 and 38. The echo path 32 represents an arbitrary path taken by the signal Ro which causes it to be fed back into the transmitting portion of the near talker equipment. The echo signal Ec (echo) is similar to the signal Ro but attenuated by the propagating medium 32. The signal Ec is combined with any signal from the near talker (Nt) to produce signal input Si as shown. The signal Si is applied to each of first and third double talk detectors 36 and 40, respectively, as well as to subtractor means 33. The adaptive filter 31 provides the second input to subtractor 33 so that the replica of the signal Ec, generated by the adaptive filter can be subtracted from the signal Si to produce the output signal So which comprises the residual echo signal Re plus the near talker signal Nt. The signal So is applied to the filter 31 to complete the servo loop of the adaptation process of the filter 31. The signal So is also applied to second and third double talk detectors 38 and 40, respectively, as well as to center clipper 35. The outputs of each of the detectors 36, 38 and 40 are applied to logic means 44. Under the control of the three detectors, logic 44 provides control outputs 41 and 42 to adaptive filter 31 and to center clipper 35 in order to selectively enable or disable the adaptive filter 31 and the clipper 35.

Figure 2:
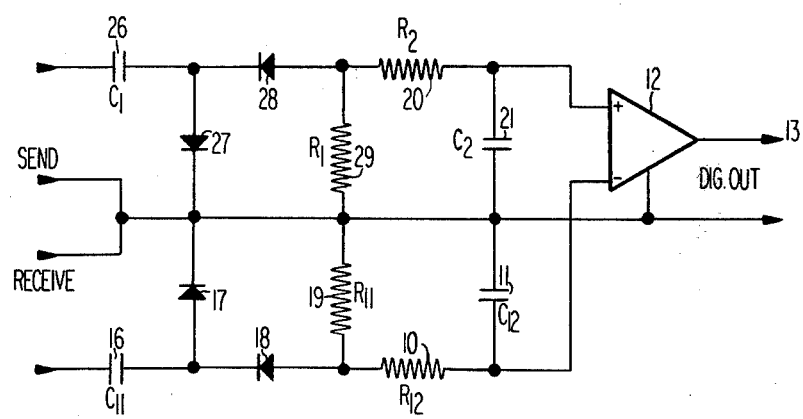
FIG. 2 is a schematic diagram illustrating a double talk detection circuit which can be used in a preferred embodiment of the present invention.

One particular type of double talk detection circuit which may be utilized in the present invention is shown in FIG. 2. The two signals are coupled by capacitors 16 and 26 to double diode detectors 17, 18 and 27 and 28, and filtered by lowpass RC filters 10 and 11, and 20 and 21. The time constant is determined by resistors 19 and 29. The d.c. voltages across capacitors 11 and 21 are compared in a comparator 12 and its output 13 indicates in binary form which of the two inputs is higher. It should be noted that the FIG. 2 circuit is merely illustrative of a particular type of detection circuit which can be used in the system shown in FIG. 3. Other detector circuits which function to determine the relative average or RMS signal value over a given time can be readily adapted for use in the echo cancellation circuit.

The triggering point of each of the detectors 36, 38, and 40 is adjusted to detect a particular condition. Specifically, the detectors can be provided with a well-known biasing arrangement at comparator 12 to detect and trigger on the following conditions:

DTD 1: Ro<2Si (Similar to prior art detector 6)

DTD 2: Ro<4So
DTD 3: Si>5So

These particular choices of coefficients (2, 4, and 5) are merely exemplary. The coefficients which can be employed will always be a matter of design choice based on system noise, desired sensitivity and other considerations which will become apparent from the description of the system operation below.

The operation of the system will be described by showing how the present invention overcomes the problems associated with the prior art system of FIG. 1. As mentioned above, a condition (Condition D, Table I below) which causes degradation of the prior art system occurs when the near talker signal Nt is of a lower amplitude than the echo signal Ec, as can occur when low quality transmission lines are used, or where the near talker is talking very softly. When this condition occurs, DTD 1 will not trigger even when the near talker is speaking since Nt is of a very low amplitude. As a result, and as discussed with regard to FIG. 1, above, the detector fails to detect a true double talk condition.

The present system, however provides a second detector, DTD 2, which avoids this problem. The latter detector compares Ro with So. After the initial adaptation period of filter 31, Re will be extremely small and therefore, when near talker speech is present, So will be substantially the same as Nt. This being the case, the detector can be adjusted to trigger when So approaches a small fraction of Ro, i.e. Ro<4So. In this manner, detector 38 will detect the presence of signal Nt even when it is of low amplitude due to the near talker's low voice or less than perfect transmission conditions. Detector 38 will accordingly control clipper 35 and adaptive loop of filter 31 in order not to distort the near talker's transmission or contaminate the adaptive loop.

The above-described detection in DTD 2 of a true double talk condition when Nt is very weak is only effective, however, after the signal Re is driven to a very low value by the adaptive loop in filter 31 ("full adaptation"). In the initial adaptive period before the filter can fully adapt, the signal Re will typically be sufficiently large so as to trigger DTD 2 even in the absence of a near talker signal Nt. To avoid false control of filter 31 and clipper 35 by DTD 2 during this adaptive period, the logic 44 operates to exclude DTD 2 from control during this period. Instead control is by DTD 1, which operates in a manner similar to the detector 6 in the system of FIG. 1.

The third detector, DTD 3, provides an indication of when the filter 31 has fully adapted to the echo signal. The condition of full adaptation (the converse of the initial adaptive period) is defined as the condition where the filter 31 is producing an accurate estimate of the echo signal Ec so as to drive the residual echo Re to an arbitrarily small value. In the example described above, this condition is deemed to occur when Si>5So. Again, this particular condition is merely exemplary and it should be understood that the condition used to determine the trigger point of each of the three detectors is a matter of choice. The detector, DTD 3, therefore, generally indicates whether or not the system is in the initial or fully adaptive period in order to shift the control of the clipping and the filter from DTD 1 to DTD 2. Specific combinations of outputs from DTD 1, DTD 2 and DTD 3 which lead to the various control outputs from logic means 44, will be discussed below.

A further function of the echo canceller is to overcome the second abovementioned shortcoming of the prior art systems, specifically, the "false double talk" condition. In the situation where the near talker is silent and the distant talker has been speaking but momentarily pauses in speech (Condition E, Table I), the pause in the distant talker speech will, in effect, propagate through insulating amplifier 37, through echo path 32, and back into the near talker's send circuit. As the distant talker's pause in speech propagates through the receive line of the near talker circuit, but before it has propagated through echo path 32 to send side of near talker's circuit, the situation exists where the signal Ro at the input of detector 38 will be zero but the signal Si will have a small, but finite, value even in the absence of Nt. This condition would trigger DTD 2 causing a false indication of double talk. In order to avoid the latter, DTD 3 discriminates between the true and false double talk conditions. The residual echo Re will be much less than Ec after the initial adaptive period. Thus, when the near talker is silent (Nt=0) DTD 3 will be triggered to its second state because the signals will satisfy the condition Si>5So. On the other hand, when near talker speech is present (true double talk), the signal Nt is the major portion of Si and So, the condition Si>5So will no longer be satisfied and DTD 3 will revert to its first state. The combination of outputs from DTD 2 and DTD 3 can therefore, generally distinguish between a true and false double talk condition.

In response to the detected false double talk, the clipper will be maintained in an enabled state so that a burst of residual echo on the send-out line will not occur. In the preferred embodiment of the invention, however, the adaptive loop of filter 31 is disabled since, by definition, there is a "pause" or lack of any signal on the receive line during false double talk. Since the lack of signal is not indicative of the quality of the far talker speech, the loop is disabled so that the adaptation process is not contaminated by the pause.

Another situation (Condition F, Table I) where selective control of the clipper and filter can be employed is where there is double talk in the fully adapted period with short breaks in the near talker speech. Since a center clipper such as clipper 35 may typically be analog in nature as opposed to filter 31 which may be digital, it is apparent that the analog clipper will not react as quickly as the digital filter to an enable/disable command. If this is the case, logic 44 can be designed to maintain the clipper 35 in a disabled state during double talk when there are very short breaks in the near talker speed, while filter 31 can be made to react to the short breaks so that it is enabled during the breaks in order to resume the adaptation process based on the far talker signal. Detector 36 is provided with a relatively long release time constant for the purpose of detecting this particular condition. The clipper will remain under the control of detector 36 and will not react to the short breaks in speech due to the long time constant. Filter 31, on the other hand, reacts to detectors 38 and 40 which have relatively fast time constants to thereby enable it to react to the short breaks in speech.

It should be noted that the above situation is merely illustrative and that either an analog or digital filter and clipper can be used in any desired combination as a matter of design choice. The necessary changes to the functions performed by logic 44 can be determined through subjective testing of the canceller in an operational environment.

The existence of any of the above described conditions is determined in combinatorial logic means 44 which receives inputs from each of the detectors 36, 38, and 40. Table I is an example of one particular logic scheme to combine the outputs of the three detectors to effect the control of the filter loop and the clipper in accordance with the various conditions described above. It should be noted that modifications of the logic to effect slightly different control of the filter and clipper for different system characteristics and requirements can obviously be made by those of ordinary skill in the art.

TABLE I

| CONDITION | DTD 1 (T1) (Long τ) | DTD 2 (T2) | DTD 3 (T3) | FILTER 0 = disable | CLIPPER 0 = disable |
|---|---|---|---|---|---|
| A. Initial Adaptive | Ro > 2Si | Ro < 4So | Si < 5So | | |

TABLE I-continued

| CONDITION | DTD 1 (T1) (Long $\tau$) | DTD 2 (T2) | DTD 3 (T3) | FILTER 0 = disable | CLIPPER 0 = disable |
|---|---|---|---|---|---|
| Period Far end talk only (no double talk) | 1 | 0 | 0 | 1 | 1 |
| B. Full Adaptation Far end talk only (No double talk) | $Ro > 2Si$ <br> 1 | $Ro > 4So$ <br> 1 | $Si > 5So$ <br> 1 | 1 | 1 |
| C. Initial or Full Adaptation Near end talker (normal double talk) | $Ro < 2Si$ <br> 0 | $Ro < 4So$ <br> 0 | $Si < 5So$ <br> 0 | 0 | 0 |
| D. Full adaptation - double talk with soft near end talker or bad transmission lines | $Ro > 2Si$ <br> 1 | $Ro > 4So$ <br> 1 | $Si < 5So$ <br> 0 | 0 | 0 |
| E. Full adaptation with pause in far talker speech and no near talker speech (false double talk) | $Ro < 2Si$ <br> 0 | $Ro < 4So$ <br> 0 | $Si > 5So$ <br> 1 | 0 | 1 |
| F. Full adaptation, double talk with short breaks in near talker speech | $Ro < 2Si$ <br> 0 | $Ro > 4So$ <br> 1 | $Si > 5So$ <br> 1 | 1 | 0 |

Table I tabulates the six conditions which may be expected to occur in voice communications systems. Condition A indicates the initial adaptive period with far-end talk only. DTD 1 indicates that $Ro > 2$ Si to define the condition $T_1 = 1$. DTD 2 detects $Ro < 4$ So to indicate the condition $T2 = 0$. DT3 3 detects $Si < 5$ So to indicate that $T3 = 0$. Each of the conditions $T_1 = 1$, $T2 = 0$ and $T3 = 0$ are delivered to logic means 44. In response to the three inputs, the clipper and the adaptive loop of the filter are enabled by the logic. Condition B is detected when $T_1 = 1$, $T_2 = 1$ and $T_3 = 1$. Under this condition (full adaptation, far end talk only), logic 44 enables both the filter loop and the clipper. Condition C (normal double talk) is detected when $T_1 = 0$, $T_2 = 0$, and $T_3 = 0$. Logic 44 responds to condition C by disabling both the filter loop and the clipper. Condition D indicates that there is double talk in the adaptive period but the near talker signal is weak. The detectors provide signals $T1 = 1$, $T2 = 1$ and $T3 = 0$ to the logic which in turn disables both the clipper and filter loop. Condition E where $T_1 = 0$, $T_2 = 0$ and $T_3 = 1$, indicates a false double talk condition. Logic 44 disable the filter loop but enables the clipper in response thereto. Finally, Condition F indicates full double talk with short breaks in Nt by providing $T1 = 0$, $T2 = 1$ and $T3 = 1$ to the logic. The filter loop is accordingly enabled during the breaks in Nt but the clipper is disabled.

Logic 44 can be designed around the scheme shown in Table I by constructing Table II as follows:

TABLE II

| CONDITION | $T_1$ | $T_2$ | $T_3$ | FILTER | CLIPPER |
|---|---|---|---|---|---|
| C | 0 | 0 | 0 | 0 | 0 |
| E | 0 | 0 | 1 | 0 | 1 |
| X | 0 | 1 | 0 | X | X |
| F | 0 | 1 | 1 | 1 | 0 |
| A | 1 | 0 | 0 | 1 | 1 |
| X | 1 | 0 | 1 | X | X |
| D | 1 | 1 | 0 | 0 | 0 |
| B | 1 | 1 | 1 | 1 | 1 |

The "don't care" conditions indicated by X are used to show conditions which are not anticipated to occur in the system for which the cancellation circuit is designed. The particular "don't care" conditions in Table II are indicated for the system described above in accordance with the scheme of present invention using Table I.

Karnaugh maps for the filter and clipper are shown in Table III in order to reduce the logic required to generate the enable/disable signals.

TABLE III

| FILTER | | | | |
|---|---|---|---|---|
| $T_3$ | $T_1$ $T_2$ 00 | 01 | 11 | 10 |
| 0 | | X | | |
| 1 | | 1 | 1 | X |

| CLIPPER | | | | |
|---|---|---|---|---|
| $T_3$ | $T_1$ $T_2$ 00 | 01 | 11 | 10 |
| 0 | | X | | 1 |
| 1 | 1 | | 1 | X |

The maps in Table III reduce the required logic as follows:

FILTER: $T_2 T_3 + T_1 \overline{T_2}$ = ENABLE

CLIPPER: $\overline{T_2} T_3 + T_1 (\overline{T_2} + T_3)$ = ENABLE

The logic 44 can be implemented by standard AND-/OR or NAND gates, or alternatively by a ROM having a look-up table programmed to provide the two logical functions shown above.

Thus it is seen that the combination of detectors 36, 38 and 40 and logic means 44 effects double talk control of the filter and clipper during the initial adaptive period (Conditions A or C) by using detector 36. After the filter has fully adapted to the echo signal, however, as determined by detector 40, control is effectively shifted to the more sensitive detector 38 (Condition D, for example). The combination logic further provides detection of particular conditions to ensure that the system does not react to a "false double talk" condition (Condition E) or a rapidly changing double talk condition (Condition F) by monitoring the outputs of each of the detectors 36, 38 and 40.

Various changes, additions and omissions of elements may be made in details within the scope and spirit of the invention, and it is, to be understood that the invention is not limited to specific details, examples and preferred embodiment shown and described.

What is claimed is:

1. In an echo cancellation circuit having a reception line for providing a distant party signal received from a distant party; a transmit line having a near party signal from a near party and an echo signal applied thereto for providing a composite signal; a filter having an adaptation process having enabled and disabled states for receiving said distant party signal at a filter input and producing a signal which estimates said echo signal, said estimated signal being produced after an initial adaptive period; subtraction means for subtracting said estimated signal from said composite signal to produce an intermediate signal along said transmission line; signal suppression means having enbled and disabled states for receiving said intermediate signal and for producing a transmitted signal; the method of selectively enabling and disabling said adaptation process and suppression means comprising the steps of:
   (a) generating a first quantitative signal when a first relationship exists between said distant party signal and said composite signal;
   (b) generating a second signal when a second quantitative relationship exists between said distant party signal and said intermediate signal;
   (c) generating a third signal when a third quantitative relationship exists between said composite signal and said intermediate signal; and
   (d) selectively disabling and enabling said filter adaptation process and said suppression means in accordance with predetermined combinations of said first, second, and third signals.

2. The method of claim 1 wherein:
   (a) said first signal is generated only when the ratio of said distant party signal to said composite signal is greater than a first predetermined ratio;
   (b) said second signal is generated only when the ratio of said distant party signal to said intermediate signal is greater than a second predetermined ratio;
   (c) said third signal is generated only when the ratio of said composite signal to said intermediate signal is greater than a third predetermined ratio; and
   (d) the second and third predetermined ratios being larger than said first predetermined ratio.

3. The method of claim 2 where said adaptation process and said suppression means are enabled when said first signal is generated while said second and third signals are not generated (Condition A).

4. The method of claim 2 wherein said adaptation process and said suppression means are enabled when all of said first, second and third signals are generated (Condition B).

5. The method of claim 2 wherein said adaptation process and said suppression means are disabled when none of said first, second, and third signals are generated (Condition C).

6. The method of claim 2 wherein said adaptation process and said suppression means are disabled when only said first and second signals are generated (Condition D).

7. The method of claim 2 wherein said adaptation process is disabled and said suppression means are enabled when only said third signals are generated (Condition E).

8. The method of claim 2 wherein said adaptation process is enabled and said suppression means are disabled when only said second and third signals are generated (Condition F).

9. The method of claim 2 wherein said third predetermined ratio is larger than said second predetermined ratio.

10. An echo cancellation circuit having a reception line for providing a distant party signal received from a distant party; a transmit line having a near party signal from a near party and an echo signal applied thereto for providing a composite signal; a filter for receiving said distant party signal at a filter input and producing a signal which estimates said echo signal, said estimated signal being produced after an initial adaptive period; subtraction means for subtracting said estimated signal from said composite signal to produce an intermediate signal along said transmission line; signal suppression means for receiving said intermediate signal and for producing a transmitted signal; a first detector receiving said distant party signal and said composite signal and providing a first output signal when a first predetermined quantitative relationship exists between said distant party signal and said composite signal; a second detector receiving said distant party signal and said intermediate signal and providing a second output signal when a second predetermined quantitative relationship exists between said distant party signal and said intermediate signal; a third detector receiving said composite signal and said intermediate signal and providing a third output signal when a third predetermined quantitative relationship exists between said composite signal and said intermediate signal; and logic means receiving output signals from each of said first, second and third detectors, wherein said logic means selectively enables and disables said filter means and suppression means under the control of said first, second and third detector output signals.

11. The echo cancellation circuit of claim 10 wherein said logic means enables said suppression means when a pause in the receive signal occurs concurrently with an absence of said near party signal.

12. The echo cancellation circuit of claim 10 wherein said filter means comprises an adaptive filter wherein said control thereof by said logic means selectively allows said adaptive filter on the one hand to adapt to produce an updated version of said estimated echo signal, and on the other hand to freeze said adaptive filter to maintain the characteristics of said adaptive filter constant.

13. The echo cancellation circuit of claims 10 or 12 wherein said signal suppression means comprises a center clipper wherein said control thereof by said logic means selectively turns on said clipper on the one hand and on the other hand turns said clipper off.

14. The echo cancellation circuit of claim 10 wherein said logic means disables said filter means and said suppression means when said near party is talking but said near party signal is of a lower amplitude than said echo signal.

15. In an echo cancellation circuit having a receive line for receiving a distant party signal received from a distant party, a transmit line having a near party signal from a near party and an echo signal applied thereto for providing a composite signal, a filter having a filter input for receiving said distant party signal and having a selectively enabled and disabled adaptive process for producing a signal which estimates said echo signal, said estimated signal being produced after an initial adaptive period, subtraction means for subtracting said estimated signal from said composite signal to produce an intermediate signal along said transmission line, signal suppression means having selectively enabled and disabled states for receiving said intermediate signal and for producing a transmitted signal, the improvement comprising:

first means for generating an output signal indicating whether or not said initial adaptive period is ended;

first double talk detection means for generating a first control output signal when a first quantitative relationship exists between said distant and near party signals;

second double talk detection means for generating a second control output signal when a second quantitative relationship exists between said intermediate and distant party signals; and control means responsive to said first means output signal and to said first and second control output signals for controlling the enablement and disablement of said signal suppression means and said filter means in accordance with said first control signal during said initial adaptive period of said filter means and for controlling the enablement and disablement of said signal suppression means and said filter means in accordance with said second control output signal after said initial adaptive period.

16. In an echo cancellation circuit having a reception line for providing a distant party signal received from a distant party; a transmit line having a near party signal from a near party and an echo signal applied thereto for providing a composite signal; a filter for receiving said distant party signal at a filter input and producing a signal which estimates said echo signal, said estimated signal being produced after an initial adaptive period;

subtraction means for subtracting said estimated signal from said composite signal to produce an intermediate signal along said transmission line; signal suppression means for receiving said intermediate signal and for producing a transmitted signal; a first detector (DTD1) for generating a first detection signal in response to the existence of a first quantitative relationship between said distant and near party signals; and first means for enabling and disabling at least one of said filter and signal suppression means in response to said first detection signal; the improvement comprising:

means for determining the end of said initial adaptive period; and a second detector (DTD2) for generating a second detection signal in response to the existence of a second quantitative relationship between said intermediate signal and said distant party signal, said first means disabling at least one of said filter and said signal suppression means in response to said second detection signal only after the end of said initial adaptive period is determined.

17. The echo cancellation circuit of claim 16 further comprising a third detector (DTD3) for generating a third detection signal indicating the end of said initial adaptive period.

18. The echo cancellation circuit of claim 17 wherein said third detector (DTD3) generates said third detection signal in response to the existence of a third quantitative relationship between said composite signal and said intermediate signal.

19. The echo cancellation circuit of claim 18 wherein at least one of said filter and said signal suppression means is enabled or disabled in accordance with said second detection signal only during the generation of said third detection signal.

20. The echo cancellation circuit of claim 16 wherein first means said filter enables when said first detector indicates that the ratio of said distant party signal to said composite signal is greater than a first predetermined ratio and said second detector indicates that the ratio of said distant party signal to said intermediate signal is less than a second predetermined ratio.

21. In an echo cancellation circuit having a reception line for providing a distant party signal received from a distant party, a transmit line having a near party signal from a near party and an echo signal applied thereto for providing a composite signal, a filter for receiving said distant party signal at a filter input and producing a signal which estimates said echo signal, said estimated signal being produced after an initial adaptive period, subtraction means for subtracting said estimated signal from said composite signal to produce an intermediate signal along said transmission line, and signal suppression means for receiving said intermediate signal and for producing a transmitted signal, a method of controlling said echo cancellation circuit, said method being of the type comprising the steps of generating a first comparison signal in accordance with the comparison of said composite signal to said distant party signal, said method further comprising:

generating a second comparison signal in accordance with the comparison of said intermediate signal and said distant party signal; and controlling at least one of said filter and said suppression means in accordance with both said first and second comparison signals.

22. The method of claim 21 further comprising: detecting the end of said initial adaptive period, said step of controlling at least comprising controlling at least one of said filter and suppression means in accordance with the comparison of said composite and distant party signals only during said initial adaptive period and controlling at least one of said filter and suppression means in accordance with the comparison of said intermediate and distant party signals only after the end of said initial adaptive period.

23. The method of claim 22 wherein said step of detecting the end of said initial adaptive period comprises comparing said composite signal to said intermediate signal.

* * * * *

UNITED STATES PATENT AND TRADEMARK OFFICE
CERTIFICATE OF CORRECTION

PATENT NO. : 4,360,712

DATED : Nov. 23, 1982

INVENTOR(S) : Otakar A. Horna

It is certified that error appears in the above-identified patent and that said Letters Patent is hereby corrected as shown below:

Col. 7, line 47 - change "disable" to --disables--;

Col. 8, Table III - first column at end under "10" insert -- 1 -- above "X";

Col. 12, line 18 - change "first means said filter enables" to --first means enables said filter--.

Signed and Sealed this

Twenty-second Day of March 1983

[SEAL]

Attest:

GERALD J. MOSSINGHOFF

Attesting Officer

Commissioner of Patents and Trademarks